United States Patent [19]

Beigang

[11] Patent Number: 5,085,306
[45] Date of Patent: Feb. 4, 1992

[54] RELEASABLE COUPLING FOR SHAFT ELEMENTS

[75] Inventor: Wolfgang Beigang, Felderhoferbrücke, Fed. Rep. of Germany

[73] Assignee: GKN Automotive AG, Siegburg, Fed. Rep. of Germany

[21] Appl. No.: 506,434

[22] Filed: Apr. 6, 1990

[30] Foreign Application Priority Data

Apr. 6, 1989 [DE] Fed. Rep. of Germany ....... 3911122

[51] Int. Cl.$^5$ ............................................. F16D 11/06
[52] U.S. Cl. ............................................. 192/79; 192/71
[58] Field of Search ............... 192/71, 79, 84 T, 93 C, 192/108

[56] References Cited

U.S. PATENT DOCUMENTS

| 2,101,366 | 12/1937 | Frank | 192/71 |
| 2,498,399 | 2/1950 | Dodge | 192/71 |
| 2,534,033 | 12/1950 | La Brie | 192/84 T |
| 2,639,015 | 5/1953 | Wolf | 192/93 C |
| 2,910,159 | 10/1959 | Nielson | 192/84 T |
| 3,150,751 | 9/1964 | Peone | 192/71 |

FOREIGN PATENT DOCUMENTS

| 0043334 | 1/1982 | European Pat. Off. |
| 1859444 | 8/1962 | Fed. Rep. of Germany . |
| 2428916 | 1/1976 | Fed. Rep. of Germany . |
| 3822115 | 1/1989 | Fed. Rep. of Germany . |
| 60-256627 | 12/1985 | Japan . |
| 1092683 | 11/1967 | United Kingdom . |
| 1239540 | 7/1971 | United Kingdom . |
| 1257893 | 12/1971 | United Kingdom . |
| 1466380 | 3/1977 | United Kingdom . |

Primary Examiner—Leslie A. Braun
Assistant Examiner—Nicholas Whitelaw
Attorney, Agent, or Firm—Toren, McGeady & Associates

[57] ABSTRACT

A coupling for establishing a releasable torque transmitting connection between a hollow shaft element (1) and a journal element (2) positioned therein, by coupling members (13) provided in apertures in the hollow shaft element and radially movable therein to engage with recesses (39) in the journal element, and an operating sleeve (4) movable axially on the shaft element for effecting such radial movement of the coupling members, has radially displaceable locking members (12) for locking the operating sleeve axially in its coupling-engaged position, and a spring for providing a returning force against which the operating sleeve is movable to such position. The operating sleeve is moved axially by an electro-magnet (27, 28) which actuates an actuating ring (8) and locking sleeve (3) which acts on the locking members (12). The locking members and coupling members are preferably balls.

11 Claims, 2 Drawing Sheets

RELEASABLE COUPLING FOR SHAFT ELEMENTS

BACKGROUND TO THE INVENTION

1. Field of the Invention

This invention relates to a coupling for establishing a releasable torque transmitting connection between a hollow shaft element and a journal element co-axially positioned therein, by means of coupling members provided in apertures in the hollow shaft element and radially movable therein to be engagable, when in radially inner positions, with respective recesses in the journal element for torque transmission with the shaft element, and an operating sleeve movable axially on the shaft element and having an annular operating face engagable with said coupling members for effecting radial inward movement thereof and a retaining face engagable with the coupling members to hold them in their radially inner positions.

Releasable torque transmitting couplings of the kind above set forth may be used in the drive line of four-wheel drive vehicles, wherein one axle, either the front or rear wheels of the vehicle, is permanently driven while the other axle is either engaged only under particular operating conditions, e.g. in the case of bad traction and slip of the wheels of the permanently driven axle, or wherein drive to the second axle is disengaged under certain operating conditions, e.g. when braking to ensure vehicle stability and accurate functioning of an anti-lock braking system if such is provided.

2. Description of the Prior Art

Various forms of releasable torque transmitting coupling are known, e.g. the one described in DE-3822115A which may be described as a claw coupling mechanism. However, such a coupling is hardly suitable for disconnecting the drive when torque is transmitted, and reconnecting it if there is a high speed difference between the elements to be coupled. Locking the axially displaceable claw sleeve is effected by way of radially displaceable locking members in the form of balls, which engage a groove in the respective hollow shaft where they are radially fixed by a locking sleeve, to axially secure the claw sleeve. Otherwise the latter might be axially displaced by the reaction forces of the teeth.

Couplings operable to be connected or released whilst under load are known from other fields of application, e.g. from JP 60-256627. In this coupling, locking members are radially displaceably held in apertures of a driving gear sleeve, freely rotating on a shaft, and engage individual recesses or grooves on the shaft where, while connecting the driving gear sleeve to the shaft, they are held by an axially displaceable locking sleeve. The locking sleeve is displaced axially by an operating fork which is magnetically actuated through a suitable lever mechanism.

SUMMARY OF THE INVENTION

It is the object of the present invention to provide a coupling of the kind herein first set forth which may be connected and released under load, is of compact design both axially and circumferentially, and which, in a functionally safe manner, may accommodate high torques.

According to the invention, we provide a coupling for establishing a releasable torque transmitting connection between a hollow shaft element and a journal element co-axially positioned therein; comprising:

a plurality of coupling members provided in apertures in the hollow shaft element, and radially movable therein;

a plurality of recesses in the journal element, in which the coupling members are respectively engagable when in radially inner positions for torque transmission between the shaft element and journal element;

an operating sleeve movable axially on the shaft element, having an annular operating face engagable with the coupling members for effecting radial inward movement thereof, and further having a retaining face engagable with the coupling elements to hold them in their radially inner positions;

means for providing a returning force against which the operating sleeve is movable to its position wherein it has caused the coupling members to move inwardly; and radially displaceable locking members for locking the operating sleeve axially in said position.

Preferably the retaining face of the operating sleeve is of frusto-conical configuration, so as not to provide a self-locking action which would otherwise tend to hold the operating sleeve in said position independently of the locking members.

Preferably the operating sleeve is provided with apertures wherein the locking members are received in fixed circumferential positions whilst being able to undergo their radial displacement, the hollow shaft element having an annular groove in which the locking members can engage on their radial inward movement axially to lock the operating sleeve, there further being provided a locking sleeve having an annular operating face for effecting such radially inward displacement of the locking members and further having a locking face for holding the locking members in their radially inwardly displaced positions wherein they engage the grove in the hollow shaft element.

The radially displaceable coupling members for torque-transmittingly connecting the shaft element to the journal element, and the radially displaceable locking members for axially locking the operating sleeve to the shaft element, preferably comprise balls which are able to accommodate high circumferential forces in the case of the coupling members and axial forces in the case of the locking members, whilst requiring only low forces to be exerted to move them radially and small distances of axial movement for the operating sleeve and locking sleeve to effect the necessary radial movement of the members.

The locking face of the locking sleeve may be cylindrical or frusto-conical.

The locking sleeve may be arranged to be moved axially by an actuating member, the operating sleeve being in turn movable by the locking members when they are moved axially by the locking sleeve.

The actuating member preferably takes the form of an actuating ring connected to the locking sleeve, the locking sleeve being rotatably supported in the actuating ring.

The actuating ring may be moved axially by electromagnetic means, preferably by an annular electro-magnet surrounding it. Alternatively, it may be moved hydraulically or pneumatically, e.g. by an annular piston arrangement which either acts on or itself constitutes the actuating ring. Another possibility is that a number of individual circumferentially spaced actuating devices, e.g. three small piston and cylinder arrangements acting on the actuating ring, may be provided.

The entire coupling device may conveniently be accommodated in a short housing having two spaced flanges within which the hollow shaft element and the journal element are supported respectively by bearings. The entire coupling mechanism is preferably disposed between the two bearings so that undesirable torsional effects are largely excluded.

When a coupling having the above described features is in use, axial movement of the actuating ring when its electro-magnet is energised causes the locking sleeve and with it the locking members to be moved axially until the locking members are able to move radially inwardly and enter the circumferential groove in the hollow shaft. The locking members are then held in their radially inwardly displaced positions, in engagement with the groove, by the locking face of the locking sleeve upon further axial movement of the locking sleeve. When the locking members are being moved axially, these in turn move the operating sleeve axially to move the coupling members radially inwardly into torque transmitting engagement with the recesses in the journal element. The coupling members are held in engagement with such recesses by the retaining face on the operating sleeve, which moves over the coupling members as the operating sleeve moves farther. The relative distances by which the parts are moved axially are selected in such a way that firstly the torque transmitting connection is established between the hollow shaft element and journal element, by entry of the coupling members into the recesses in the latter, followed shortly after (in practice almost synchronously) by axial locking of the operating sleeve on a short additional axial displacement of the locking sleeve.

Release of the torque transmitting connection is established in the opposite sequence of movements. Firstly, a small force, e.g. that of a spring, initiates the axial movement of the locking sleeve until the locking members are free to move radially outwardly. As the locking members begin to move radially outwardly under their freedom, from the annular groove (in the hollow shaft element) which preferably has a frustoconical wall, the torque being transmitted by the coupling begins to cause axial movement of the operating sleeve, as a result of the force which the coupling members exert on the retaining face of the operating sleeve which is of frusto-conical configuration. The axial force exerted on the operating sleeve in turn causes the locking members to completely move outwardly from the annular groove in the hollow shaft element and release the operating sleeve for further axial movement.

BRIEF DESCRIPTION OF THE DRAWING

The invention will now be described by way of example with reference to the accompanying drawings, in which FIG. 1 shows the coupling in its released condition, whilst the lower part shows the coupling in its torque transmitting condition.

DETAILED DESCRIPTION OF THE PREFERRED EMBODIMENT

Figure 1:
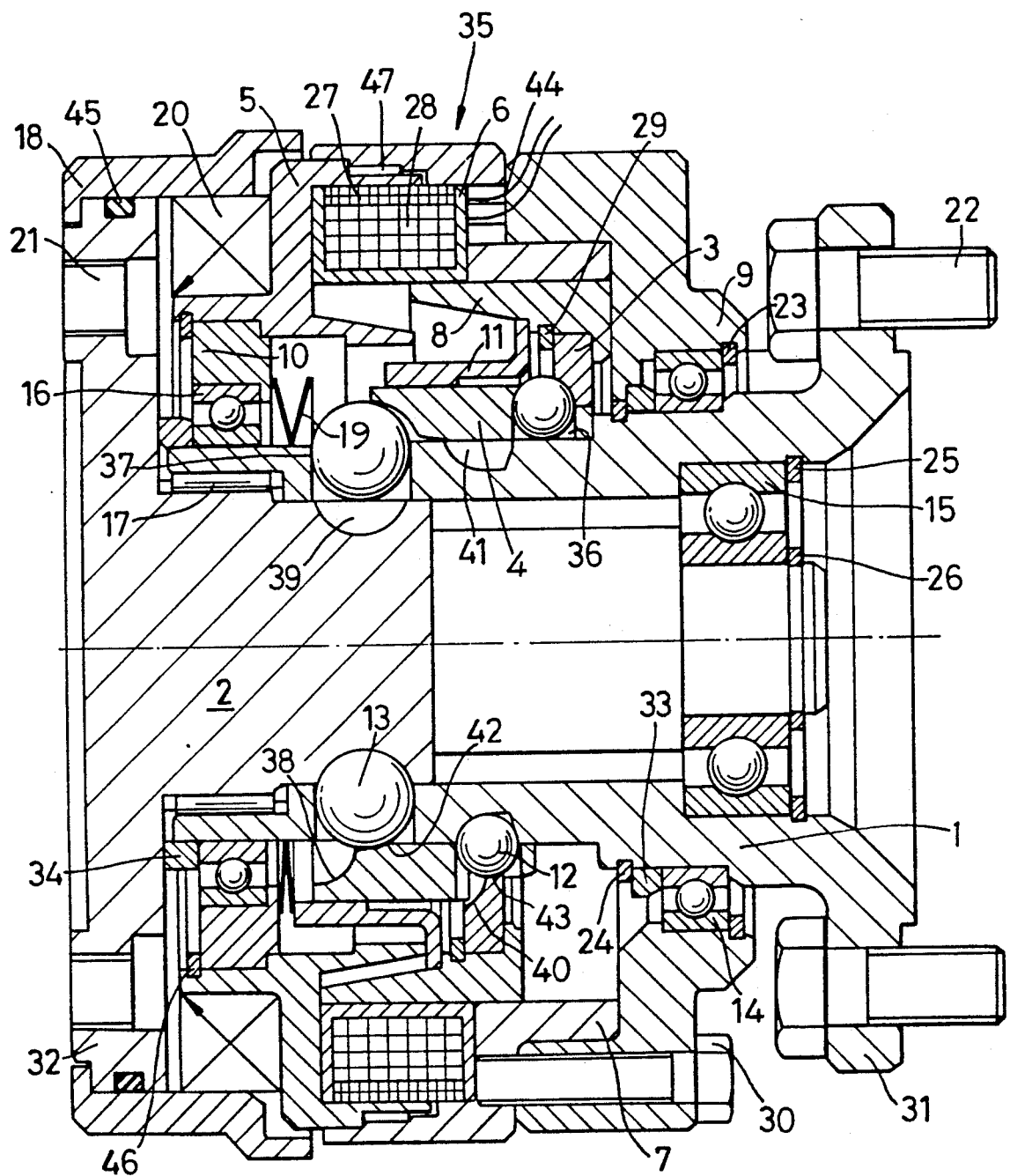
FIG. 1 is a longitudinal cross-section through a coupling according to the invention. The upper part of drawing

The illustrated coupling comprises a housing 35 comprising separate housing parts 5, 7, 9. Within the housing are disposed a hollow shaft element 1 and a journal element 2, the shaft element having a flange 31 with bolts 22 for torque transmitting connection to another rotary element. The journal element 2 has a flange 32 with screw-threaded apertures 21 for receiving bolts for torque transmitting connection to another element.

The housing part 9 is of a magnetically insulating material, and is connected to the housing part 7 by way of bolts 30. The housing parts 5 and 7 are connected to one another by a screw-threaded connection 47. Ball bearings 14, 16 support the housing on the hollow shaft element 1, the bearing 16 being held in a magnetically insulating bearing carrier 10 and the bearing 14 being held directly in the magnetically insulating housing part 9. The bearing 14 is fixed by a securing ring 23 in the housing part 9, and by a securing ring 24 and a spacer ring 33 on the hollow shaft 1. The bearing 16 is held by a spacer ring 34 spaced from the journal element 2, with the bearing carrier 10 being fixed in the housing part 5 by a securing ring 46.

The journal element 2 is supported relative to the hollow shaft element 1 by a ball-bearing 15 and a needle roller bearing 17. The ball-bearing 15 is fixed within the hollow shaft element 1 by a securing ring 25, and to the journal element 2 by a securing ring 26. The needle roller bearing 17 is axially disposed between steps in the shaft element and journal element. The flange 32 of the journal element 2 carries a protective tube 18, sealed thereto by an 0-ring 45, whilst the protective tube 18 is sealed relative to the housing part 5 by a shaft sealing ring 20.

Figures 2, 3:
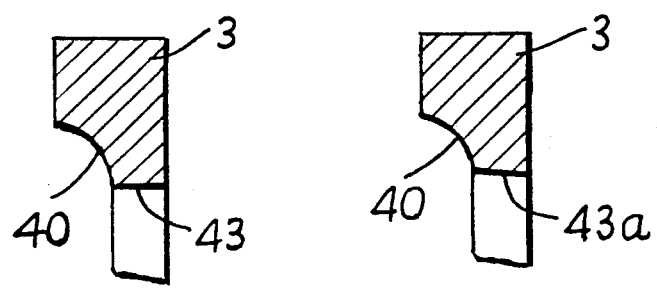
FIGS. 2 and 3 show detail sections through different forms of locking sleeve.

There is provided an actuating ring 8 in which a locking sleeve 3 is axially held by a securing ring 29. The locking sleeve 3 has an annular operating face 40 and a locking face 43 which is cylindrical as shown in FIG. 2 or slightly frusto-conical as shown at 43a in FIG. 3. Movable axially on the hollow shaft element 1 is an operating sleeve 4 which, at its end adjacent the locking sleeve 3, has apertures 36 within which are received respective locking members in the form of balls 12 for radial movement. At the opposite end of the operating sleeve 4 it has an annular operating face 38 and a frusto-conical retaining face 42. These faces of the operating sleeve are arranged to cooperate with coupling members in the form of balls 13, which are received in respective radial apertures 37 in the hollow shaft element 1 for radial movement, and when in their radially innermost positions are engagable with respective part-spherical recesses 39 provided in the journal element 2. When the coupling members 13 are engaged in the recesses 39, they establish a torque transmitting connection between the shaft element and journal element, in the manner shown in the lower part of the drawing, and can be retained in such positions by contact with the retaining face 42 of the operating sleeve when the latter has moved axially to the left. When the operating sleeve is in this position, the apertures 36 therein, wherein the locking balls 12 are received, are in alignment with an annular groove 41 in the hollow shaft element 1, the groove being of tapered configuration with frusto-conical walls.

Between the housing parts 5 and 7 there is disposed an annular electro-magnet having a coil carrier 6 and two windings, namely an operating winding 28 and a holding winding 27. Conductors from such windings extend outwardly from the housing as indicated at 44.

Within the actuating ring 8 there is disposed a pressure ring 11 which extends axially over the operating sleeve 4. The pressure ring 8 is arranged to be engagable with a spring 19 disposed adjacent the bearing carrier 10.

With the coupling in the released condition, energisation of the winding 28 of the electro-magnet moves the actuating ring 8 to the left with reference to the drawing. This moves the locking sleeve 3 with it, pressing on the locking balls 12 and thus on the operating sleeve 4. The operating face 38 of the operating sleeve causes the coupling members (balls) 13 to move radially inwardly to engage the recesses 39 in the journal element 2, until the retaining face 42 of the operating sleeve can move over the coupling elements to hold them in engagement with the recesses. As this has happened the apertures 36 in the operating sleeve come into alignment with the annular groove 41 in the hollow shaft element 1, and the operating face 40 of the locking sleeve 3 causes the locking balls 12 to move radially inwardly to enter the groove. When they have done so, the locking sleeve moves farther to the left until its locking face 43 moves over the locking balls 12 to hold them in engagement with the annular groove. In this condition, the operating sleeve is locked axially to hold the coupling in the torque transmitting condition, as illustrated in the bottom half of the drawing. It will be noted that in this condition the pressure ring 11 has compressed the spring 19. Once the coupling has been brought into the torque transmitting condition, the winding 27 of the electro-magnet, which may be of higher resistance than the winding 28 to exert a lower magnetic force on the actuating ring, can be energised and the winding 28 de-energised. The axial force which has to be exerted on the actuating ring 8 to hold the coupling in the engaged condition is significantly less than the force which has to be exerted to bring it to the torque transmitting condition.

When the coupling is required to be released from the torque transmitting condition, the electro-magnet is completely de-energised whereupon the spring 19 moves the pressure ring 11, locking ring 3, and actuating ring 8 to the right. When the locking face of the locking ring has been removed from the locking elements 12 the elements are free to move radially outwardly and unlock the operating sleeve to permit its axial movement to the right. By virtue of the retaining face 42 of the operating sleeve being frusto-conical, the torque transmitting coupling members 13 exert a force on the operating sleeve to move it to the right and as it does so the locking members 12 completely disengage from the annular groove, being moved radially outwardly by the tapering configuration of the walls of the groove. Finally the radial outward movement of the coupling members 13 is completed, so that the coupling can no longer transmit any torque.

As an alternative to the arrangement of electromagnetic coils 27, 28 for moving the actuating ring 8 axially, fluid pressure operating means could be provided. This could comprise an annular piston-cylinder arrangement, or a number of individual circumferentially spaced axially operating piston and cylinder arrangements. In either event, it will be noted that the actuating device is held stationary with the housing 35 and supported by bearings 16, 14 relative to the rotating parts of the coupling.

I claim:
1. A coupling for establishing a releasable torque transmitting connection between a hollow shaft element and a journal element co-axially positioned therein; comprising:
   a plurality of coupling members provided in apertures in the hollow shaft element, and radially movable therein;
   a plurality of recesses in the journal element, in which the coupling members are respectively engagable when in radially inner positions for torque transmission between the shaft element and journal element;
   an operating sleeve movable axially on the shaft element, having apertures therein and an annular operating face engageable with eh coupling members for effecting radial inward movement thereof, and further having a frusto-conical retaining face engageable with the coupling elements to hold them in their radially inner positions;
   means for providing a returning force against which the operating sleeve is movable to its position wherein it has caused the coupling members to move inwardly;
   radially displaceable locking members for locking the operating sleeve axially in said position, locking members being received in the apertures of the operating sleeve in fixed circumferential positions while being able to undergo said radial displacement, an annular groove being provided in said hollow shaft element, in which annular groove said locking members are engageable, upon their radial inward displacement, axially to lock the operating sleeve; and
   a locking sleeve movable axially and having an annular operating face for effecting said radial inward displacement of the locking members and further having a locking face for holding the locking members in their radially inwardly displaced positions wherein they engage the groove in the shaft element.

2. A coupling according to claim 1 wherein said locking face of the locking sleeve is cylindrical.

3. A coupling according to claim 1 wherein said locking face of the locking sleeve is frusto-conical.

4. A coupling according to claim 1 further comprising an actuating member arranged to move said locking sleeve axially, and wherein the operating sleeve is arranged to be moved axially by the locking members when they are moved by the locking sleeve.

5. A coupling according to claim 4 wherein said actuating member comprises an actuating ring connected to the locking sleeve.

6. A coupling according to claim 5 wherein the locking sleeve is rotatably supported in the actuating ring.

7. A coupling according to claim 5 comprising electromagnetic means for moving said actuating ring axially.

8. A coupling according to claim 7 wherein said electro-magnetic means comprises an annular electro magnet surrounding the actuating ring.

9. A coupling according to claim 7 wherein said electro-magnetic means is supported by bearing means relative to at least one of said shaft element and journal element, and is prevented from rotating.

10. A coupling according to claim 1 wherein the coupling members comprise balls.

11. A coupling according to claim 1 wherein the locking members comprise balls.

* * * * *